INVENTORS
ROBERT N. MELLOTT
JOHN J. PHELAN

BY Claude Funkhouser

ATTORNEY

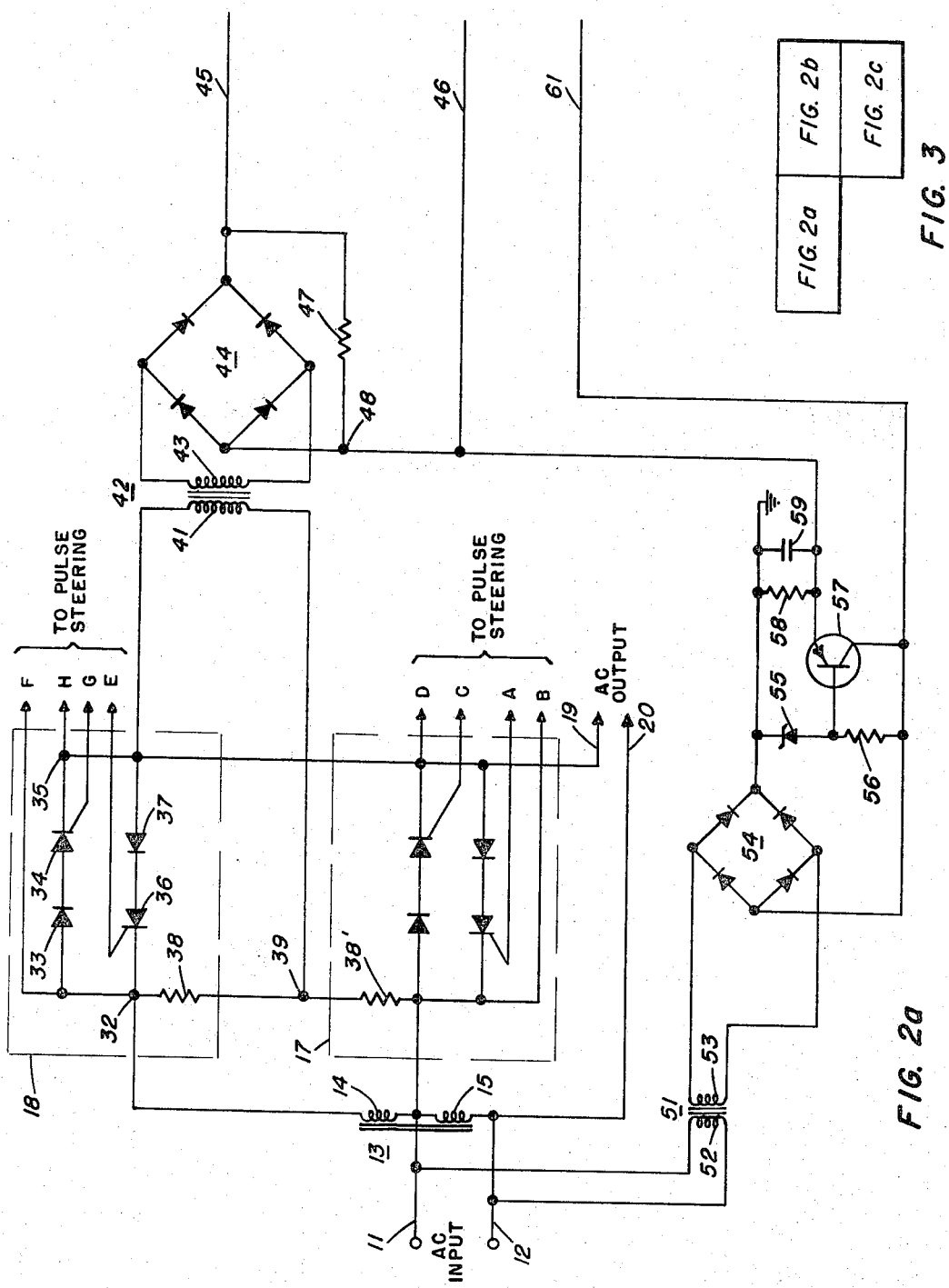

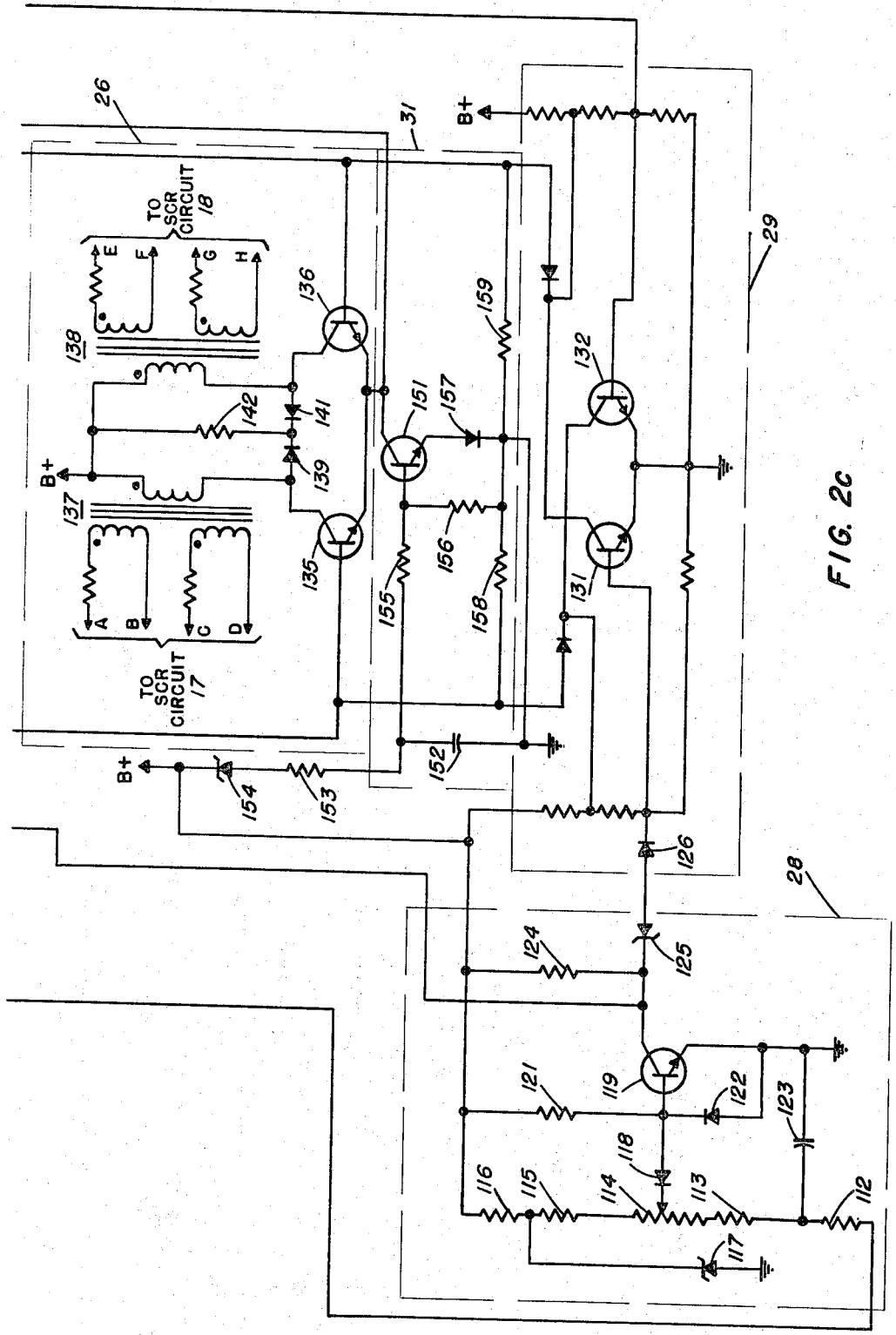

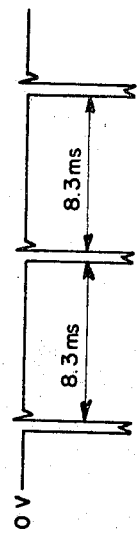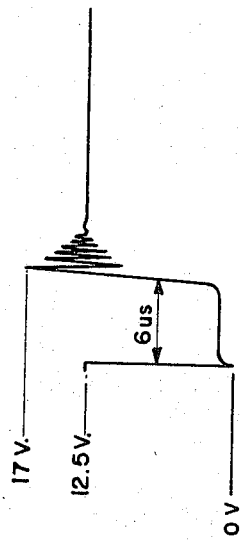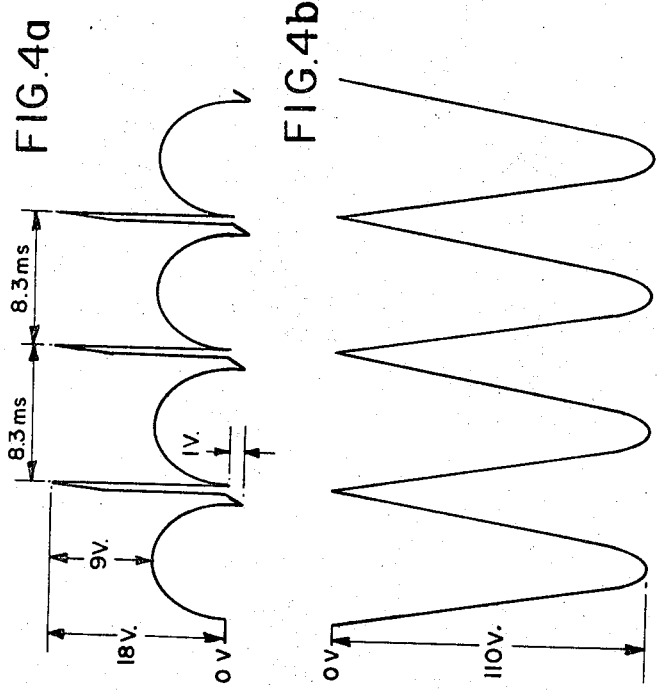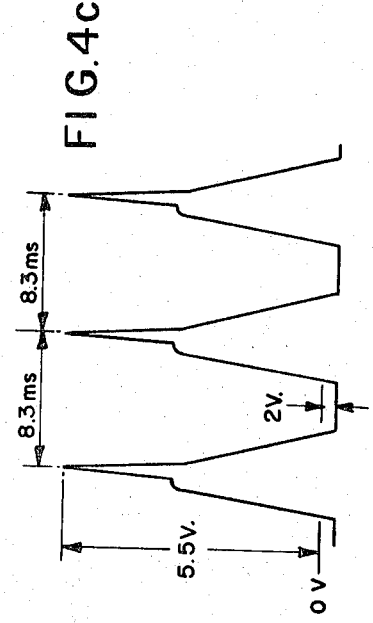

United States Patent Office 3,375,437
Patented Mar. 26, 1968

3,375,437
MAINTENANCE OF POWER SUPPLY REGULATION DURING LOW-LINE TRANSIENTS
Robert N. Mellott, Palos Verdes Estates, and John J. Phelan, Woodland Hills, Calif., assignors, by mesne assignments, to the United States of America as represented by the Secretary of the Navy
Filed Mar. 15, 1965, Ser. No. 440,038
4 Claims. (Cl. 323—22)

ABSTRACT OF THE DISCLOSURE

A voltage regulator to regulate the output of a power supply during low-line transients. Under normal line conditions, the line voltage is fed unamplified through the regulator to the power supply by means of an autotransformer. When the line voltage drops, the regulator functions to fire parallel connected rectifiers, connected in each side of the line, to activate additional windings on the autotransformer thereby stepping up the output. This action prevents the power supply from losing regulation during low-line transients.

---

The present invention relates to a regulator circuit and more particularly to a voltage regulator circuit utilizing semiconductor devices.

As technology advances and equipment becomes more sophisticated, the need for power supplies and power sources that can maintain closer tolerances to line voltages becomes more importance. The prior art abounds with devices using silicon controlled rectifiers to regulate line voltage during line transients, which transients drop the voltage below a point at which the power supplies can maintain regulation. Many of these devices solve the problem by switching taps on a transformer. None of these devices, however, explicitly solve the problem of sensitivity to varying load phase characteristics. The present invention solves this problem.

The regulator of the present invention provides precise regulation supply line voltage for a circuit load which is inductive and constantly varying. The variance of the inductance is a function of the load, the load transients and the variations of the components of the circuitry that the regulator feeds. Obviously, the more inductance the load presents, the longer it takes for the regulator circuit to bring the output voltage of the device up to an acceptable value. Inherent in the device of this invention is a solution to this problem.

Forming part of the present invention are two silicon controlled rectifier circuits in parallel. When the line voltage is behaving normally; that is, in the absence of transients, one set of the silicon controlled rectifiers is not triggered and the line voltage passes through the silicon controlled rectifier circuits unchanged. When the line voltage drops below an acceptable level, the regulator steps the voltage output up. The firing pulses are sent to the other set of the silicon controlled rectifier circuits so that the rectifier passing current in the right direction for the polarity of the line voltage during a given half cycle is fired. This silicon controlled rectifier circuit ceases conducting when the voltage across it is reduced to zero. When the next set of firing pulses is sent to this particular circuit, during the next half cycle line voltage, the opposite silicon controlled rectifier is fired.

An object of the present invention is the provision of a regulator circuit for use with a varying load.

A further object of the present invention is the provision of a regulator circuit which will maintain adequate voltage levels when the load connected to such a device is varying in inductive impedance.

Yet another object is the provision of a regulator circuit that insures adequate regulation throughout a broad range of load phase variation.

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 1 illustrates a functional block diagram of an embodiment of the invention.

FIG. 2, a multisheet drawing composed of FIGS. 2a, 2b and 2c, illustrates a schematic diagram of the embodiment shown in FIG. 1.

FIG. 3 depicts the arrangement of the sheets of drawing of FIG. 2.

FIGS. 4a, 4b and 4c illustrate typical waveforms at various points of the subtractor circuit.

FIGS. 5a and 5b illustrate typical waveforms at points of the pulse steering circuit.

Figure 1:
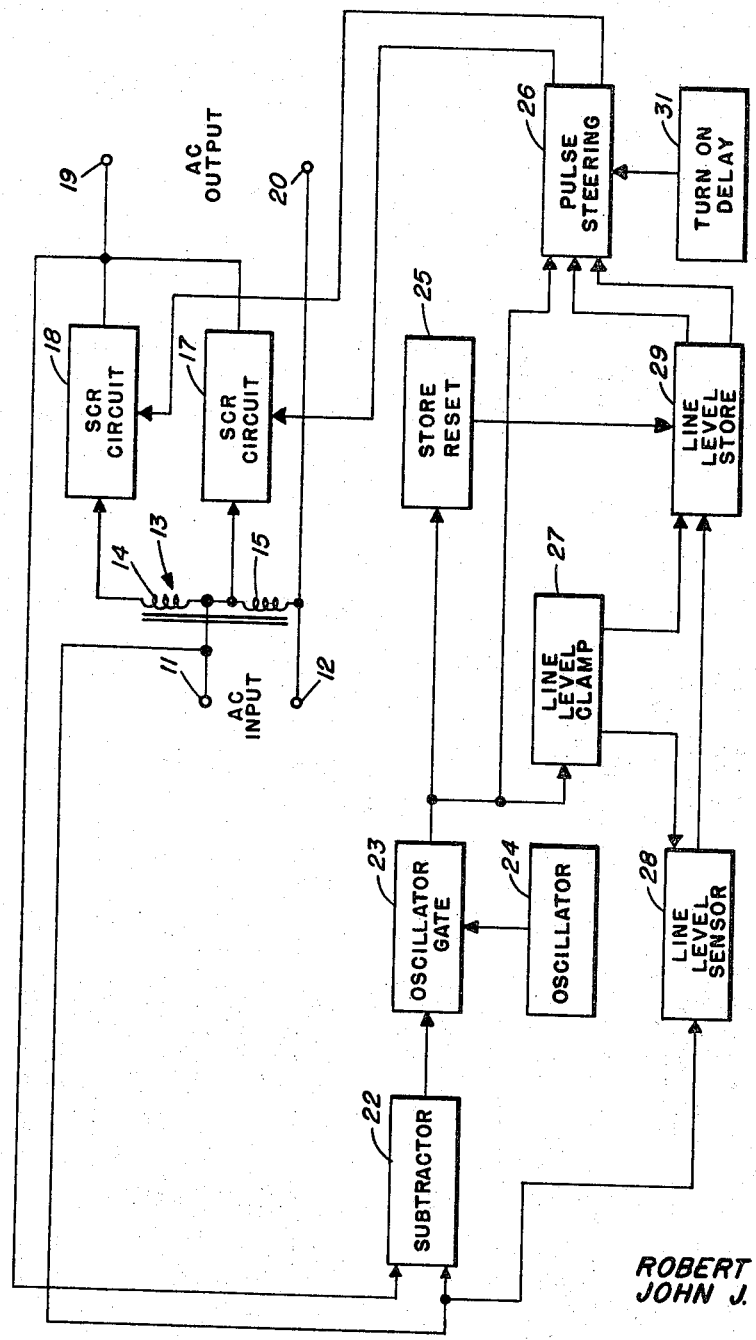

Referring now to the drawings, there is shown in FIG. 1 a pair of input terminals 11 and 12 capable of receiving an alternating current input signal. Terminals 11 and 12 are connected to either side of a coil 15 of an autotransformer 13 consisting of coils 14 and 15. Between the intersection of coils 14 and 15; that is, the center tap of the transformer, a lead connects to a first silicon controlled rectifier circuit 17. Connected to the high terminal of coil 14 is a second silicon controlled rectifier circuit 18. The outputs of silicon controlled rectifier circuits 17 and 18 are tied together at an output terminal 19. The other end of coil 15 is tied to terminal 12 and to a second output terminal 20.

A subtractor circuit 22 has dual inputs connected thereto. The alternating current signal input is fed from terminal 11 to the subtractor and the alternating current output signal is fed thereto from terminal 19. The output of the subtractor 22 is fed to an oscillator gate circuit 23. Another input to the oscillator gate circuit 23 receives the output signal from an oscillator 24. The output of the oscillator circuit goes to a storage reset circuit 25, a pulse steering circuit 26 and a line level clamp circuit 27.

The alternating current voltage input is also fed to a line level sensor circuit 28. The output of the line level sensor circuit is in turn fed to a line level store circuit 29. Both the line level sensor circuit 28 and the line level store circuit 29 are fed by line level clamp circuit 27. Dual outputs from the line level storage circuit are received as inputs to the pulse steering circuit 26. Further inputs to the pulse steering circuit 26 come from the oscillator gate 23 and a turn-on delay circuit 31. Dual outputs from the pulse steering circuit 26 are received by silicon controlled rectifier circuits 17 and 18, respectively, serving as trigger inputs thereto.

In operation, the oscillator circuit 24 continually produces pulses. When these pulses are required, oscillator gate 23 feeds them to the pulse steering circuit 26. The pulse steering circuit 26 in turn transmits these pulses to the proper one of the silicon controlled rectifier circuits 17 and 18. In order to determine which of the last-mentioned circuits requires pulses, the subtractor circuit 22 calculates the voltage across the silicon controlled rectifiers; that is, subtracting a scale voltage representing a line voltage from a scale voltage representing the output voltage.

When neither silicon controlled rectifier circuit is fired, there is no output voltage. Under these conditions, the silicon controlled rectifier voltage is approximately equal to the line voltage. When the voltage across the silicon controlled rectifier circuits is above a predetermined level, the oscillator gate 23 permits pulses to be fed to the pulse steering circuit 26. If a rectifier is fired, the voltage across it is at such a level that the oscillator gate 23 blocks further transmission of pulses. When the line voltage nears zero volt and reverses; that is, approaches the other half cycle, the silicon controlled rectifier that had fired ceases conducting and the firing cycle is repeated. Pulses must be sent from circuit 26 each half cycle line voltage in order to have an output during each half cycle.

To determine if the line voltage level is too low and, therefore, which pair of silicon controlled rectifiers should receive firing pulses from the steering circuit 26, the line level sensor 28 examines the amplitude of each half cycle of the line voltage. If the line voltage is higher than an acceptable level, the line level storage circuit 29 is set. This circuit determines which side of the pulse steering circuit will transmit firing pulses.

After the rectifiers have fired, the oscillator gate 23 transmits a signal to the store reset circuit 25 which circuit in turn resets the line level store 29 so that firing pulses will be transmitted to the silicon controlled rectifiers on the high tap of the auto transformer 13. If, on any half cycle, the line voltage is below an acceptable level, the line level sensor 28 does not transmit any signal to the line level store 29, firing pulses are sent to the high tap of the autotransformer; that is, firing pulses are sent to the silicon controlled rectifier circuit 18.

The purpose of signals to the line level store circuit 29, during the time firing pulses are transmitted to the silicon controlled rectifier circuits, is to prevent pulse transmission to both sets of rectifiers, thereby preventing the possibility of both sets firing on the same half cycle. If there were no line level clamp 27, under heavily inductive load, this condition could occur. This would result in the rectifiers firing near the peak voltage of the line voltage.

Turn-on delay circuit 31 prevents the pulse steering circuit 26 from transmitting pulses until a voltage supply circuit (not shown) of the voltage regulator has reached its nominal value and the regulator circuits have settled down. The turn-on delay also insures that the oscillator 24 will start oscillation by providing a start impulse shortly after turn-on of primary power. This all occurs a very short time after commencing operation.

Figure 2B:
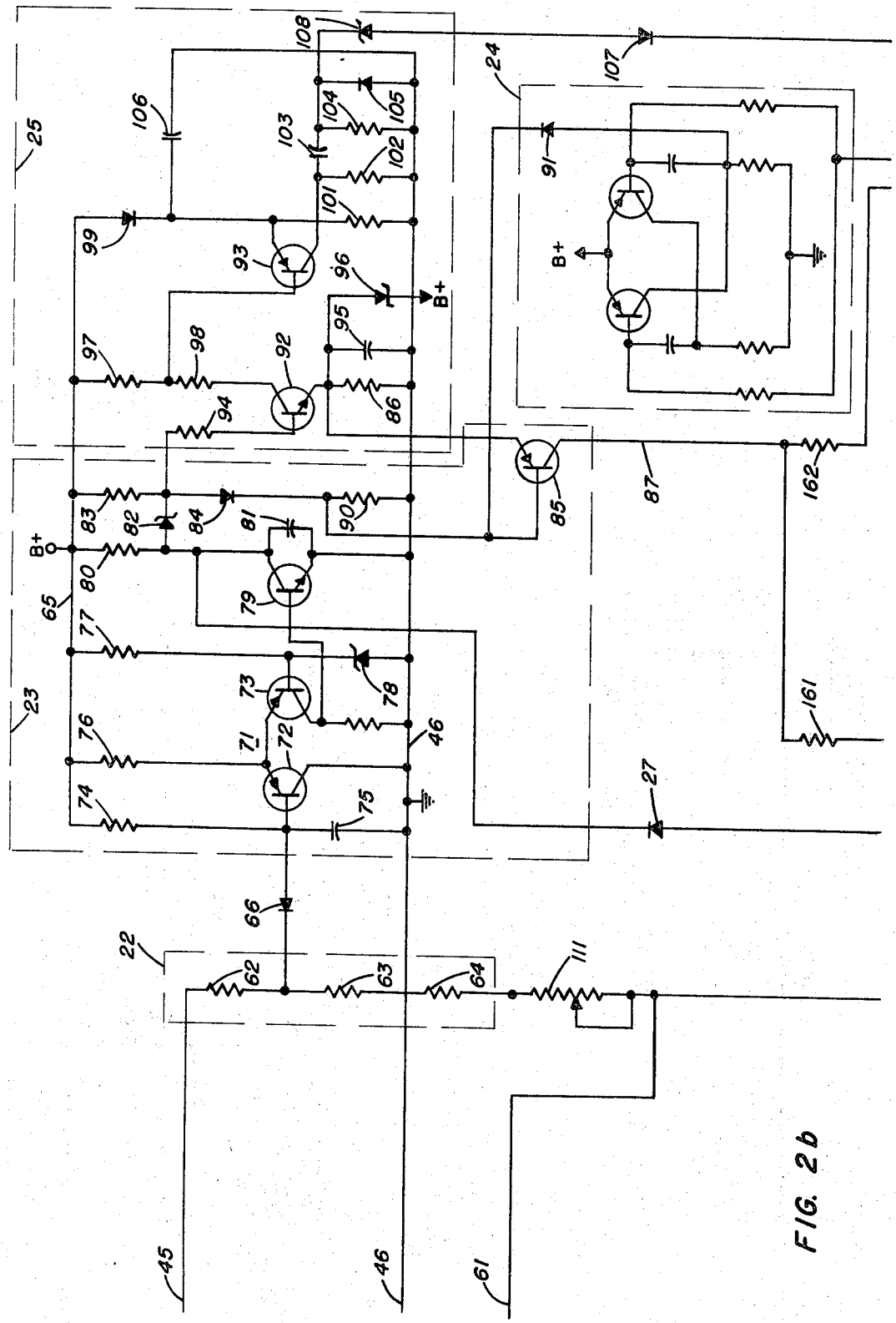

Turning now to FIG. 2, a multisheet figure comprising FIGS. 2a, b and c (the arrangement of the sheets is shown in FIG. 3), the input terminals 11 and 12, as shown in FIG. 2a, connect to the center tap of the autotransformer 13 and the lower end of coil 15, respectively. The other side of coil 14 is connected to the silicon controlled rectifier circuit 18. The center tap of transformer 13 is connected to the silicon controlled rectifier circuit 17.

Both silicon controlled rectifier circuits 17 and 18 are identical in configuration and operation. The lead from the high side of the transformer coil 14 is connected to a terminal 32. From this terminal point, a lead F goes to the pulse steering circuit 26. A series leg also comes from the point 32 containing a semiconductor diode 33 and a silicon controlled rectifier 34. The anode of the diode is connected to terminal point 32. The cathode of the diode is connected to the anode of silicon controlled rectifier 34. The cathode of the silicon controlled rectifier is connected to a terminal point 35. Coming from the terminal point 35 is a lead H, also going to the pulse steering circuit 26. The trigger terminal from the silicon controlled rectifier 34 is labeled G and goes to the pulse steering circuit. Additionally, coming from terminal point 32 is another series leg of silicon controlled rectifier 36 and semiconductor rectifier diode 37. The cathode of the rectifier 36 is connected directly to the terminal point 32. The anode is connected to the cathode of the diode 37 and the anode of diode 37 is connected to terminal point 35. The trigger lead from silicon controlled rectifier 36 is labeled E and also goes to the pulse steering circuitry 26. One end of a resistor 38 is also connected to terminal point 32. The other side is connected to another terminal point 39. The terminal 35 also connects to the primary 41 of an iron core transformer 42. The other side of the primary of the transformer is connected to the terminal point 39. Silicon controlled rectifier circuit 17 is of identical configuration to circuit 18. The lead from the center tap of transformer 13 is connected to a resistor 38$^1$, the other end of which is connected to terminal point 39. The output leads D, C, A and B also go to pulse steering circuitry. D, C, A and B are connected to like points in silicon controlled rectifier circuit 17 as are points F, H, G and E in silicon controlled rectifier circuit 18, respectively. Terminal point 35 connected to leads A and D also serves as one side of the AC output, that labeled 19 in the functional diagram. The low end of coil 15 of autotransformer 13 is connected to another lead 20 which serves as the other side of the alternating current output. A secondary coil 43 of the transformer 42 is connected to terminals of a conventional diode bridge circuit 44. The output leads from the diode bridge 44 are connected to a lead 45 and to a lead 46, the latter-mentioned lead is grounded. A connection is made between lead 45 and lead 46 via resistor 47.

Taps are taken from the alternating current input leads 11 and 12 to an iron core transformer 51. The primary 52 thereof is connected to the alternating current input leads 11 and 12. The secondary 53 is connected to the input of the diode bridge 54 of like configuration to bridge 44. The output leads of the bridge are connected in parallel to series connected zener diode 55 and resistor 56. The base of a transistor 57 is connected to the junction formed by the connection between the diode 55 and resistor 56. The other end of zener diode 55 is grounded. The emitter lead of transistor 57 goes to terminal point 48. Connected in parallel with the cathode of the diode 55 and the emitter of the transistor 57 is a resistor 58 and a capacitor 59. The lead from the collector of the transistor is tied to the other output of the diode bridge 54.

An output lead 45 from diode bridge 44 is connected to one end of the resistance of the subtractor circuit 22. This subtractor circuit consists of resistors 62, 63 and 64 connected in series. The lead 45 is connected to one side of the resistor 62 and a variable resistor 111 is connected to one end of resistor 64. From the junction of leads 62 and 63 is a diode 66, the cathode of which is connected to this junction. The anode end of the diode connects to the input lead to the oscillator gate circuitry 23.

The lead 46 is also connected to ground bus of the power regulator and, specifically, to the ground of the oscillator gate circuit 23. The oscillator gate circuit 23 consists of a differential amplifier 71 having a first PNP transistor 72 and a second PNP transistor 73. A voltage bus 65; that is, a lead connected to B+ has a resistor 74 and capacitor 75 tied between the positive bus 65 and ground lead 46. Connected at the junction of the resistor 74 and capacitor 75 is the base lead of the transistor 72. Another resistor 76 goes from the positive bus 65 to the emitter of transistor 72 and transistor 73 which are tied together. The collector of the transistor 72 is tied directly to the ground. A further resistor 77 is tied from the positive bus 65 to the base of transistor 73, and from the base of transistor 73 to the ground bus 46 is a zener diode 78, the anode of which is connected to ground bus and the cathode of which is connected to the base of transistor 73. From the collector of transistor 73, a lead goes to the base of an NPN transistor 79. The collector of transistor 79 is biased by a connection through a resistor 80 connected on the other end to the positive voltage bus 65. Tied across the collector and emitter of this transistor is a capacitor 81. The anode of a zener diode 82 is connected between the resistor 80 and the collector of transistor 79. The cathode is tied to the positive bus 65 via another resistor 83. Further diode 84 and resistor 90 connects the cathode of the zener diode to the ground bus 46. Connected between the junction of the diode 84 and the resistor 90 is the base of another PNP transistor 85. The emitter of transistor 85 is tied to the ground bus 46 through a resistor 86 which also biases the collector of a transistor in the store reset circuit 25, to be described hereinafter. The collector lead 87 of transistor 85 goes to the pulse steering circuitry 26. The junction of resistor 80 and capacitor 81, associated with the transistor 79, also is connected to the cathode of a semiconductor diode 27. A lead from the junction of diode 84 and resistor 90 is connected to the oscillator circuit 24.

The oscillator 24 is an astable flip-flop, well known in the art. Its output is from the anode of a rectifier 91 therein.

Storage reset circuitry 25 consists of an NPN transistor 92 and PNP transistor 93. The base of transistor 92 is connected to the junction of resistor 83, and diodes 82 and 84, through a current limiting resistor 94. The emitter of transistor 92 is connected to the ground bus via resistor 86 and capacitor 95, which are in parallel and connected to B+ through a zener diode 96. The collector is connected to the positive bus 65 via two series resistors 97 and 98. Connected between the junction of resistors 97 and 98 is the base of transistor 93. The emitter of the transistor 93 is connected to the positive bus via a diode 99 and to the ground bus 46 via resistor 101. The collector of the transistor 93 is connected to the ground bus 46 via a resistor 102 which is connected to the junction of the collector and to a capacitor 103. The other end of the capacitor is connected to a resistor 104 which is connected to the ground bus at its other terminal. A further diode 105 is connected in parallel with the resistor 104. Also connected to the emitter of transistor 93 is a capacitor 106, the other end of which is connected to the ground bus 46. Between the junction of capacitor 103 and resistor 104 is the cathode of a zener diode 108. The anode is connected to the anode of a semiconductor diode 107, the cathode of which is connected to the line level storage circuitry 29.

The input voltage scaled down appears on lead 61, which is connected to an adjustable resistor 111 which is connected to the line level sensing circuitry 28 and a series of resistors; 112, 113, adjustable resistor 114 and resistors 115 and 116. Connected to the junction of resistors 115 and 116 is the cathode of a zener diode 117, the anode of which is tied to ground.

The wiper arm of the adjustable resistor 114 is connected to the cathode of a diode 118, the anode of which is connected to the base of a transistor 119. Also connected to this point is a resistor 121 which in turn is connected to the other end of the resistor 116. The emitter of the NPN transistor 119 is also connected to the anode of diode 122. The collector of the transistor 119 is connected to the anode of the line level clamp 27, and the collector is biased through resistor 124 which is tied on its other end to B+ voltage.

The output from line level sensor 28 is taken from the collector lead connected to the cathode of the zener diode 125. The anode of this zener diode is connected to the anode of a conventional semiconductor diode 126, the cathode of which is connected, in turn, to the input of line level storage circuit 29.

The line level storage circuit consists of two transistors 131 and 132. The emitters of these transistors are tied together to a ground point. The base of transistor 131 is directly connected to the cathode of rectifier 126, and the base of transistor 132 receives a signal from the store reset circuit 25. Dual outputs from line level store circuit 29 are received by pulse steering circuit 26. These outputs are from the collector leads of transistors 131 and 132. The output from the collector lead 132 is tied through a diode to the base of transistor 135. Similarly, the output from the collector of transistor 131 is tied through a diode to the base of transistor 136.

Transistors 135 and 136 are of the NPN variety, having their emitters tied together and in turn tied to the output from the turn-on delay circuit 31, to be discussed hereinafter. The collector of transistor 135 and the collector of transistor 136 are each connected to one side of the primary coils of transformers 137 and 138 tied together via diodes 139 and 141. The other sides of these coils are connected to the source of positive voltage B+. The anodes of these diodes are directly connected to the transistor leads and the cathodes are tied together. At the cathode junction the diodes 139 and 141 are connected to a resistor 142 the other end of which is connected to B+. The output coils of transformers 137 and 138 are split and the output leads therefrom go to the silicon controlled rectifier circuits. The outputs from the silicon controlled rectifier circuit 17 are connected to the secondary coils of transformer 137 with polarity markings as shown. The outputs labeled A, B, C and D are the outputs of the split output coil of transformer 137. Also polarity marked as shown and connected to silicon controlled rectifier circuit 18 are leads labeled E, F, G and H. The base of transistor 135 is connected through a resistor 161, a connection is made to the collector terminal of transistor 85 which, it will be recalled, forms a portion of the oscillator gate circuit 23. The base of transistor 136 is also connected to this point via resistor 162.

The turn-on delay circuit 31 consists of a single NPN transistor 151 whose base is connected between a ground point and B+ via series path of capacitor 152, resistor 153 and zener diode 154 the cathode of which is connected directly to the B+ voltage. The base of the transistor 151 is connected between the junction of resistor 153 and capacitor 152 through a current limiting resistor 155. Between the junction of resistor 155 and the base of transistor 151 is one end of the resistor 156 and the emitter is connected to a point common with the other side of resistor 156 through a diode 157, the anode of which diode is connected to the emitter terminal and the cathode is connected to the other end of the resistor 156. The common juncton between the resistor 156 and diode 157 is connected through resistors 158 and 159 to the base of transistors 135 and 136, respectively.

As discussed hereinbefore, the primary function of the regulator circuit is to regulate line voltage during low-line transients. Under normal conditions, the line voltage is fed without amplification through the regulator circuit to the load circuit via the center tap of transformer 13. When the line voltage drops below a predetermined level, the regulator steps this output up utilizing tap 32 of the autotransformer 13. The voltages in the last case, therefore, is that appearing across coils 14 and 15 of the transformer. This action prevents the load from losing regulation during a period of low-level transients.

The silicon controlled rectifiers act as a switch. When the rectifiers are fired, the switch is closed, when they are not fired, it is open, thereby causing the voltage on either coils 14 and 15 or coil 15 alone to be transmitted. The silicon controlled rectifiers 34 and 36 in both circuits 17 and 18 are wired in parallel, facing in opposite directions. Firing pulses from the pulse steering circuit 26 are sent to both silicon controlled rectifiers of a pair so that, dependent upon which half cycle the line voltage is going through, at least one of the silicon controlled rectifiers is enabled to pass voltage. When the particular silicon controlled rectifier that has been conducting ceases firing, due to the alternating nature of the voltage wave, the voltage across it is reduced to zero and the next set of firing pulses received from the pulse steering circuit is again sent through this leg causing the rectifier connected in the other polarity to be fired. Diodes 33 and 37, in series with silicon controlled rectifiers 34 and 36, respectively, prevent excessive leakage current in the rectifier which is receiving firing pulses, but facing in a direction such that it is not fired.

The subtractor circuit consisting of resistors 62 to 64 is simply a voltage divider circuit so that either end of the input coil 41 of transformer 42 is receiving a scaled voltage proportional to the alternating current output voltage. The other end of the subtractor circuit; that is, the end of resistor 64, is connected through transformer 51, rectifier circuit 54 and transistor stage 57 with its associated components, to the alternating current input voltage. These two voltages; that is, the output voltage and the input voltage, are subtracted and scaled by the subtractor circuit 22 so that the voltage at the cathode of diode 66 represents a quantity proportional to the line voltage subtracted from the output voltage. This quantity is the voltage appearing across the silicon controlled rectifiers. When the rectifiers are not fired, the magnitude of the voltage at the cathode of diode 66 is proportional to the line voltage.

FIGS. 4a, 4b and 4c show typical waveforms at the subtractor 22. FIG. 4a is voltage waveform at one input to the subtractor, as on lead 45, and represents a sample portion of the output of the regulator which is fed back to the subtractor. FIG. 4b is the voltage waveform at another input to the subtractor, as on lead 61, and represents the input line voltage. It is these two voltages which the subtractor circuit is comparing. FIG. 4c is the waveform at the output of the subtractor circuit and is representative of the difference between the inputs. The 18 v. peak voltage of FIG. 4a is the result when none of the silicon controlled rectifiers is fired. The voltage between these spikes (9 v. rectified sine wave) is approximately equal to 0.1 line voltage and occurs when the silicon controlled rectifiers are fired. The voltage of FIG. 4b is the 105 v. supply unclipped output voltage. The waveform shown in FIG. 4c is the difference waveform when the rectifiers are fired. This difference is not exactly equal to zero because the silicon controlled rectifiers and associated protective diodes have a small voltage drop, and the scaling is deliberately set so that the component variation will not permit voltage of the right polarity to be inadvertently fed to the oscillator gate when the silicon controlled rectifiers are fired. Typically, when the rectifiers are fired, a small negative voltage developes at the cathode of the diode 66 and is clipped when the transistor 72 is turned on. The diode bridge 44 forms a full wave bridge for the voltage to the transformer 42. Resistor 47 refers this voltage to the ground point 46. Diode 66 provides transistor 72 with voltage protection, if the silicon controlled rectifier circuits fire improperly.

Transistors 72 and 73 form a differential amplifier with the base of transistor 73 referred to a voltage less than B+ by the zener diode 78. When the voltage on the base of transistor 72 exceeds this voltage, the transistor is turned off and transistor 73 is turned on. The capacitor 75 removes high frequency noise from the base of transistor 72. Resistor 74 supplies the reverse drive necessary to cut off transistor 72 and, as a result, diode 66 is cut off. Resistor 76 properly biases the emitters of transistors 72 and 73, and resistor 77 in conjunction with B+ provides a bias current to keep the zener diode 78 in its operating region. When transistor 73 is on, a signal from its collector passes to the base of transistor 79.

When transistor 79 is on, its collector potential is approximately equal to ground potential causing zener diode 82 to conduct. This biases the base of transistor 85 on. This is through the diode 84. When transistor 79 is conducting, it absorbs the current from resistor 124 in the line level sensor preventing the signal from line level sensor from being transmitted to the line level store 29. Additionally, when transistor 79 is conducting, potential current flow to the base of transistor 92 is diverted by the path completed by zener diode 82. Capacitor 81 serves to reduce the potential noise on the collector of transistor 79.

The storage reset circuit 25 is composed of transistors 92 and 93. Transistors 92 and 93 generate, amplify and delay the store reset signal. When transistor 79 in the oscillator gate circuit 23 turns off, transistors 92 and 93 turn on. The collector of transistor 93 rises to a voltage slightly less than B+, and a positive pulse is coupled through capacitor 103 to transistor 132 of the line level store circuit. The diode 108 functions as a noise clipper. Resistor 94 is a base current limiting resistor for the transistor 92. Resistor 86, capacitor 95 and zener diode 96 form a bias supply for the emitters of transistor 92 and transistor 85 in the oscillator gate circuit 23. Resistors 97 and 98 are the collector load for transistor 92. Resistor 97 also serves as base current limiting resistor for transistor 93. Crystal rectifier 99, resistor 101 and capacitor 106 form the supply for biasing the emitter of the transistor 93. Resistor 104 and diode 105 form a quick recovery path for the capacitor 103.

The oscillator 24 is an astable flip flop. Its output on the anode of crystal rectifier 91 is a series of negative pulses ranging from a voltage approximately that of B+ to ground. The pulse repetition rate is determined by the values of capacitors and resistors in the circuit of the flip flop. The base drive of the transistor is provided through the control channel on delay circuit 31.

The turn-on delay circuit 31 primarily consists of a transistor 151. When this transistor conducts, the oscillator transistors have base drive and can produce pulses. Further, the pulse steering circuit transistor has a path for an emitter current and can transmit firing pulses to a silicon controlled rectifier. The turn-on delay circuit provides a start impulse to the oscillator, if needed. None of these functions can be provided until the transistor is biased in the on condition which occurs a very short time after the B+ supply of the regulator is at a stable voltage. This delay is provided by the zener diode 154, resistor 153 and capacitor 152. Resistors 158 and 159 provide a discharge path for the capacitor 152 and hold transistor 151 off until B+ supply output is of sufficient value. Rectifier 157 adds to the collector to emitter drop of transistor 151, biasing the emitters of transistors 135 and 136 in the pulse steering circuit 26 at a more positive value than the base bias resulting from transistor 132 in the line level storage circuit 29.

The line level sensor 28 consists of a single transistor stage 119. The line voltage amplitude is the input signal from the line level sensor which circuit is essentially a peak detector and is fed to a resistor divider filter composed of resistors 113 to 116 and capacitor 123. Resistor 112 and capacitor 123 form a low path filter.

Resistor 116 and the zener diode 117 form a supply at the opposite end of the filter which is used to provide better accuracy of the filter. Potentiometer 114 checks the switching point for the transistor 119, enabling the switching point to be set anywhere within a range of plus or minus 10% around 105 volts. When the negative supply output voltage is large enough, the current through resistor 121, attached to the transistor base, is drawn through diode 118 cutting the transistor off. Diode 118 isolates the base from the supply voltage developed across the zener diode 117, diode 122 prevents the transistor from possible damage caused by large negative-going signals and resistor 124 provides a positive output through the zener diode 125 to set the line level store 29 when transistor 119 is off and, additionally, when transistor 79 of the oscillator gate circuit 23 is off.

Line level store circuit 29 is a set-reset flip-flop activated by a positive pulse through the line level sensor diode 126 and a reset signal through rectified diode 107. The output of the line level store flip flop clamps the base of either transistor 135 or 136 in the pulse steering circuit 26, preventing an output simultaneously from both of these transistors. When a line voltage peak is large enough, however, transistor 119 and line level sensor 28 cut off resistor 124 and drive current through zener diode 125 and conventional semiconductor diode 126, turning on transistor 131, thereby preventing pulses from reaching the base of transistor 136, but when transistor 132 is on, transistor 135 cannot transmit pulses. When transistor 85 of the oscillator gate transmits positive pulses, the unclamped bases of transistors 135 and 136 in the pulse steering circuitry 26 conduct, and when transistor 135 is pulsed on, its collector drops to a voltage near ground level generating a voltage on the primary coil of transformer 137. The secondary windings generate signals of the proper polarity for the nominal pair of silicon controlled rectifier gates; that is, firing pulses are sent to silicon controlled rectifiers 34 and 36 over leads A and C, as shown in FIGS. 5a and 5b, respectively. The resistance, in series with secondary windings of transformer 137, limits gate currents after firing and thereby prevents possible damage to the gates. Rectifiers 139 and 141 along with resistor 142 provide transformer 138 with a recovery path at the end of the pulse. In a similar manner, the transistor 136 and elements in its path in conjunction with transformer 138 provide a similar function; that is, protection to silicon controlled rectifiers gating circuits 18.

Thus, a regulator circuit has been completely fully described which insures that silicon controlled rectifiers will fire through a broad range of load phase variations solving the problem of sensitivity to varying load phase characteristics and regulating a line voltage during line transients dropping below the point at which conventional power supplies can maintain regulation.

Obviously many modifications and variations of the present invention are possible in the light of the above teachings. It is therefore to be understood that within the scope of the appended claims the invention may be practiced otherwise than as specifically described.

We claim:
1. A voltage regulator comprising:
   a first and a second silicon controlled rectifier circuit, each having a pair of silicon controlled rectifiers in parallel and connected in opposite directions of conductivity;
   control leads connected to the rectifiers to initiate and terminate their conduction;
   an autotransformer having first and second coils and a center tap between them, the first rectifier being connected at one end of the first coil and the second rectifier being connected at the center tap;
   input leads connected between the center tap and the end of the second coil of the autotransformer for applying potential to be regulated;
   output leads for the regulated potential connected between the end of the second coil and the parallel output of the rectifiers;
   means for comparing the input and output potentials;
   pulse steering means connected to the comparison means for generating control signals indicative of the comparison and applying these control signals to one or the other of the rectifiers through the control leads;
   sensing means for sensing deviation of the input potential from a predetermined norm and operatively connected to the pulse steering means for controlling operation of said pulse steering means; and
   line level storage means connected between the sensing means and the pulse steering means for blocking the operation of the pulse steering means and therefore the conduction of the rectifiers should the input potential be below the predetermined norm.

2. The generating means of claim 1 further including: oscillator means,
   gating means operatively connected to said oscillator means, said comparison means and said line level storage means.

3. The device of claim 2 further including:
   reset means connected between said line level storage means and said oscillator means.

4. The device of claim 3 further including:
   delay means operatively connected to said pulse steering means for blocking the pulse steering means until said device stabilizes.

References Cited
UNITED STATES PATENTS

| | | |
|---|---|---|
| 2,965,833 | 12/1960 | Jensen. |
| 3,075,136 | 1/1963 | Jones. |
| 3,103,616 | 9/1963 | Cole et al. |
| 3,195,038 | 7/1965 | Fry _____ 323—43.5 X |
| 3,263,157 | 7/1966 | Klein _____ 323—22 |

JOHN F. COUCH, *Primary Examiner.*

A. D. PELLINEN, *Assistant Examiner.*